(12) United States Patent
Mankowski

(10) Patent No.: US 9,589,196 B2
(45) Date of Patent: *Mar. 7, 2017

(54) MULTICOLOR BIOMETRIC SCANNING USER INTERFACE

(71) Applicant: BlackBerry Limited, Waterloo (CA)

(72) Inventor: Peter Mankowski, Waterloo (CA)

(73) Assignee: BlackBerry Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/061,137

(22) Filed: Mar. 4, 2016

(65) Prior Publication Data

US 2016/0188989 A1    Jun. 30, 2016

Related U.S. Application Data

(63) Continuation of application No. 14/030,187, filed on Sep. 18, 2013, now Pat. No. 9,311,545.

(51) Int. Cl.
*G06F 21/32* (2013.01)
*G06K 9/00* (2006.01)
*H05B 33/08* (2006.01)

(52) U.S. Cl.
CPC ..... *G06K 9/00912* (2013.01); *G06K 9/00013* (2013.01); *H05B 33/0872* (2013.01)

(58) Field of Classification Search
None
See application file for complete search history.

(56) References Cited

U.S. PATENT DOCUMENTS

| 6,060,001 | A  | 5/2000  | Welch et al. |
| 6,268,055 | B1 | 7/2001  | Walters et al. |
| 6,657,614 | B1 | 12/2003 | Ito et al. |
| 6,690,362 | B1 | 2/2004  | Motoyama et al. |

(Continued)

FOREIGN PATENT DOCUMENTS

| WO | 01/54051    | 7/2001 |
| WO | 2010/080311 | 7/2010 |

(Continued)

OTHER PUBLICATIONS

James Clayton & Michael J. Hodgin, 'screen Printable Polymers for Wafer Level Packaging. A Technology Assessment, Polymer Assembly Technology, Epoxy Technology, Inc. USA' 2004.

*Primary Examiner* — Kumar Patel
*Assistant Examiner* — Amy C Onyekaba
(74) *Attorney, Agent, or Firm* — Ridout & Maybee LLP

(57) ABSTRACT

A mobile computing device may include a biometric sensor in proximity with a color-controlled layer. Where the color of the color-controlled layer may be changed, a processor of the mobile computing device may control the color of the color-controlled layer responsive to sensing various conditions. For example, the color of the color-controlled layer may be controlled, by default, to match the housing of the mobile computing device. Responsive to sensing an approaching user finger, the color-controlled layer may be controlled to change color. The color-controlled layer may be controlled to change color again upon contact of the finger, upon removal of the finger and upon determining authentication success. The color-controlled layer may be structured as a mix of heating elements and thermochromic polymer elements.

19 Claims, 10 Drawing Sheets

(56) References Cited

U.S. PATENT DOCUMENTS

| | | |
|---|---|---|
| 6,863,844 B2 | 3/2005 | Engardio et al. |
| 7,023,600 B2 | 4/2006 | Mallya et al. |
| 7,101,660 B2 | 9/2006 | Cunningham et al. |
| 7,147,923 B2 | 12/2006 | Roberts et al. |
| 7,189,456 B2 | 3/2007 | King |
| 7,199,868 B2 | 4/2007 | Maase et al. |
| 7,215,881 B2 | 5/2007 | Borngraber et al. |
| 7,455,424 B2 | 11/2008 | Maase et al. |
| 7,465,414 B2 | 12/2008 | Knox et al. |
| 7,465,415 B2 | 12/2008 | Wang et al. |
| 7,906,214 B2 | 3/2011 | Seybert et al. |
| 7,907,346 B2 | 3/2011 | Swarup et al. |
| 7,924,272 B2 | 4/2011 | Boer et al. |
| 7,955,681 B2 | 6/2011 | Krishnan et al. |
| 7,999,989 B2 | 8/2011 | Asai et al. |
| 8,077,373 B2 | 12/2011 | Kumar et al. |
| 8,129,471 B2 | 3/2012 | Chakravarti et al. |
| 8,153,344 B2 | 4/2012 | Faler et al. |
| 8,280,118 B2 | 10/2012 | Ueki et al. |
| 8,320,645 B2 | 11/2012 | Maase et al. |
| 8,324,578 B2 | 12/2012 | Dinh et al. |
| 8,343,391 B2 | 1/2013 | Schlunt et al. |
| 9,311,545 B2 | 4/2016 | Mankowski |
| 2001/0026632 A1 | 10/2001 | Tamai |
| 2004/0129787 A1 | 7/2004 | Saito et al. |
| 2004/0252867 A1 | 12/2004 | Lan et al. |
| 2005/0079386 A1 | 4/2005 | Brown et al. |
| 2005/0240778 A1 | 10/2005 | Saito |
| 2006/0017862 A1 | 1/2006 | Song et al. |
| 2006/0181521 A1 | 8/2006 | Perreault et al. |
| 2008/0225297 A1* | 9/2008 | Hossu .............. G06K 9/00899 356/445 |
| 2009/0060296 A1 | 3/2009 | Mainguet |
| 2009/0155456 A1 | 6/2009 | Benkley et al. |
| 2009/0273562 A1 | 11/2009 | Baliga et al. |
| 2009/0324956 A1 | 12/2009 | Otani et al. |
| 2010/0119802 A1 | 5/2010 | Ford et al. |
| 2010/0208953 A1* | 8/2010 | Gardner .............. G06K 9/00006 382/124 |
| 2011/0135850 A1 | 6/2011 | Saha et al. |
| 2011/0262636 A1 | 10/2011 | Ohta et al. |
| 2011/0267279 A1 | 11/2011 | Alvarez Rivera et al. |
| 2011/0279883 A1 | 11/2011 | Kumar et al. |
| 2011/0281070 A1 | 11/2011 | Mittal et al. |
| 2011/0317886 A1* | 12/2011 | Matsuoka .............. G06F 21/32 382/124 |
| 2012/0014569 A1 | 1/2012 | Frye et al. |
| 2012/0062364 A1* | 3/2012 | Rowe .................. A61B 5/0075 340/5.82 |
| 2012/0072157 A1 | 3/2012 | Alameh et al. |
| 2012/0102332 A1 | 4/2012 | Mullin |
| 2012/0120473 A1 | 5/2012 | Kumar et al. |
| 2012/0136148 A1 | 5/2012 | Lu et al. |
| 2012/0148846 A1 | 6/2012 | Martin et al. |
| 2012/0156508 A1 | 6/2012 | He et al. |
| 2012/0166944 A1 | 6/2012 | Cotterill |
| 2012/0212484 A1 | 8/2012 | Haddick et al. |
| 2012/0258773 A1 | 10/2012 | Alvarez Rivera et al. |
| 2013/0075613 A1 | 3/2013 | Dinh et al. |
| 2013/0075676 A1 | 3/2013 | Purdy et al. |
| 2013/0095290 A1 | 4/2013 | Muisener et al. |
| 2014/0109018 A1 | 4/2014 | Casey et al. |

FOREIGN PATENT DOCUMENTS

| | | |
|---|---|---|
| WO | 2012/170066 | 12/2012 |
| WO | 2012/170287 | 12/2012 |
| WO | 2013/049248 | 4/2013 |

* cited by examiner

MULTICOLOR BIOMETRIC SCANNING USER INTERFACE

CROSS-REFERENCE TO RELATED APPLICATIONS

The present application is a continuation application of U.S. patent application Ser. No. 14/030,187, filed Sep. 18, 2013, the contents of which are hereby incorporated herein by reference.

FIELD

The present application relates generally to biometric scanning and, more specifically, to a structure for a multicolor biometric scanning user interface.

BACKGROUND

As mobile telephones have received increasing amounts of computing power in successive generations, the mobile telephones have been termed "smart phones." Along with increasing amounts of computing power, such smart phones have seen increases in storage capacity and, consequently, increased utility. Beyond telephone functions, smart phones may now send and receive digital messages, be they formatted to use email standards, Short Messaging Service (SMS) standards, Instant Messaging standards and proprietary messaging systems. Smart phones may also store, read, edit and create documents, spreadsheets and presentations. Accordingly, there have been increasing demands for smart phones with enhanced privacy. Such enhanced privacy is frequently accomplished using authentication functions.

BRIEF DESCRIPTION OF THE DRAWINGS

Reference will now be made, by way of example, to the accompanying drawings which show example implementations; and in which.

DETAILED DESCRIPTION

Figure 1:
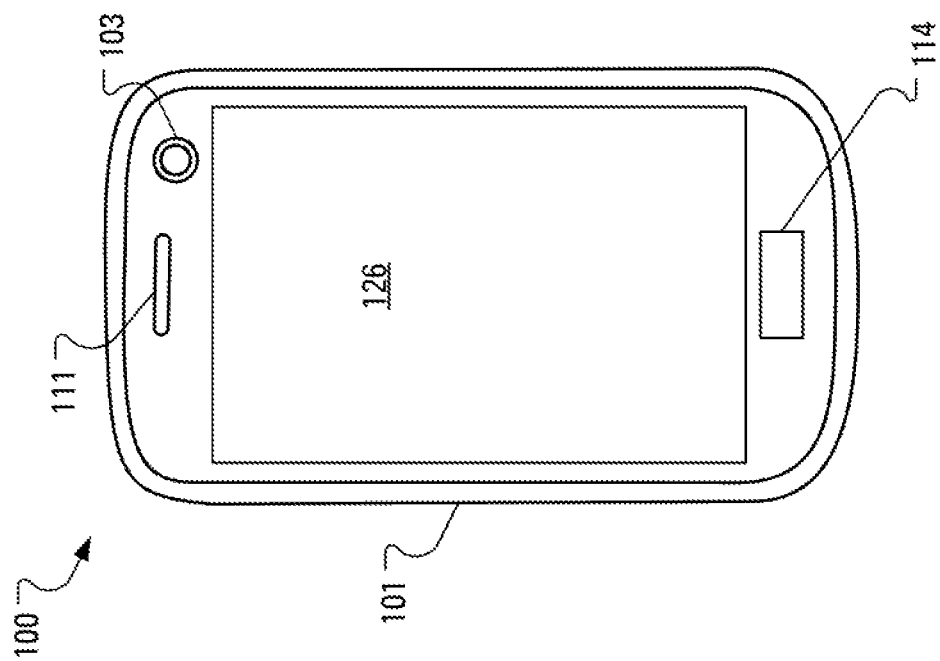
FIG. 1 illustrates an anterior side of a mobile communication device featuring a multicolor fingerprint scanning interface.

Today's smart phone unit with any type of fingerprint sensor may be perceived to have at least one flaw—sensor color. The lack of color option for surface of the fingerprint sensor may be seen to make the user experience sub-optimal and some may consider that, from an industrial design perspective, the fingerprint sensor appears out of place. Most smart phones have a housing whose top surface (plastic and screen frame) is uniformly colored, with the oft-used colors including black, white, and shades of grey.

The surface of the fingerprint sensor, to remain functional for most solutions, may not be painted. As such, a dark "gold" sensor color stands in contrast to the color of the remainder of the top surface of the device. The dark "gold" color is the typical natural color Complementary Metal Oxide Semiconductor (CMOS) silicon as seen through a substantially transparent protective layer. The protective layer may be, for example, epoxy or, for another example, glass. The protective layer may be, for an even further example, a combination of epoxy and glass.

It is proposed herein to enhance the user experience and appearance of a smart phone fingerprint sensor.

A mobile computing device may include a biometric sensor with a color-controlled layer positioned in proximity to the biometric sensor. The color-controlled layer may be overlaid on top of the sensor, or it may be placed underneath the sensor. Where the color of the color-controlled layer may be changed, a processor of the mobile computing device may control the color of the color-controlled layer responsive to sensing various conditions. For example, the color of the color-controlled layer may be controlled, by default, to match the housing of the mobile computing device.

Responsive to detecting a predetermined condition, such as sensing an approaching user finger, the color-controlled layer may be controlled to change color from an initial color to a second color. The color-controlled layer may be controlled to change color again upon contact of the finger, upon removal of the finger and upon determining authentication success. Authentication success may be determined by comparing the sensed fingerprint to a stored fingerprint template. The template may be stored on the device or on a server or cloud in communication with the device.

Other examples of a predetermined condition include a shaking of the computing device or a gesture. The shaking of the device may occur when the computing device is picked up and the color changes to indicate it has become active. A gesture could include any gesture known in the field of multi-touch gestures including but not restricted to a tap, a pinch, a flick, a long press and a rotate. Any of these gestures occurring in proximity, such as a hover mode, or in contact with the biometric sensor may cause the color of the color-controlled layer to be adjusted.

As the color-controlled layer is placed over or under the biometric sensor, the perceptible color of the sensor will change as the color of the color-controlled layer changes.

The color changing of the color-controlled layer may be based on temperature changes produced by thermal injection of the driver.

According to an aspect of the present disclosure, there is provided a method of controlling a perceived color of a biometric sensor that is a component of a mobile computing device. The method includes controlling a layer positioned over the biometric sensor to display an initial color that may be consistent with a color for a portion of a surface of the mobile computing device that surrounds the biometric sensor. In other aspects of the present application, a processor is provided for carrying out this method and a computer readable medium is provided for adapting a processor in a mobile computing device to carry out this method.

According to another aspect of the present disclosure, there is provided a method of changing a perceptible color of a biometric sensor in a computing device. The method includes detecting a predetermined condition and, responsive to the detecting, controlling a current flow provided to a color-controlled layer positioned in proximity to the biometric sensor to change the perceptible color from an initial color of the biometric sensor to a second color of the biometric sensor. In other aspects of the present application, a processor is provided for carrying out this method and a computer readable medium is provided for adapting a processor in a computing device to carry out this method.

According to another aspect of the present disclosure, there is provided a biometric scanning user interface. The biometric scanning user interface includes a layer including a plurality of heat-sensing elements, a multi-element layer positioned in proximity to the layer of heat-sensing elements, the multi-element layer including a plurality of heating elements and a plurality of thermochromic polymer elements and a driver adapted to control the plurality of heating elements to control a temperature of the multi-element layer to, thereby, control a color of the plurality of thermochromic polymer elements. The multi-element layer may be overlaid over the layer of heat-sensing element or may be placed underneath the layer of heat-sensing elements. The heat-sensing elements may include photovoltaic sensors for converting solar energy into direct current electricity.

In other aspects of the present disclosure, a method of changing a color of the thermochromic polymer elements within the biometric scanning user interface from an initial color to a second color is provided, as well as a processor for carrying out this method and a computer readable medium for executing steps to perform this method. The method of changing the color may occur upon detecting a predetermined condition, and responsive to the detecting, activating a driver to control the plurality of heating elements to control a temperature of the multi-element layer to, thereby, control a color of the plurality of thermochromic polymer elements.

Other aspects and features of the present disclosure will become apparent to those of ordinary skill in the art upon review of the following description of specific implementations of the disclosure in conjunction with the accompanying figures.

FIG. 1 illustrates an anterior side of a mobile communication device 100. Many features of the anterior side of the mobile communication device 100 are mounted within a housing 101 and include a display 126, a speaker 111, an anterior (user-facing) lens 103 and a multicolor fingerprint scanning interface 114.

The mobile communication device 100 includes an input device and an output device (e.g., the display 126), which may comprise a full graphic, or full color, Liquid Crystal Display (LCD).

In some implementations, the input device and output device are combined, such as in the implementation illustrated in FIG. 1, wherein the display 126 comprises a touchscreen. In other implementations, the input device is a keyboard 224 (see FIG. 2) having a plurality of keys. In touchscreen implementations, the keyboard 224 may comprise a virtual keyboard provided on the display 126. Other types of output devices may alternatively be utilized.

The housing 101 may be elongated vertically, or may take on other sizes and shapes (including clamshell housing structures). In the case in which the keyboard 224 includes keys that are associated with at least one alphabetic character and at least one numeric character, the keyboard 224 may include a mode selection key, or other hardware or software, for switching between alphabetic entry and numeric entry.

Figure 2:
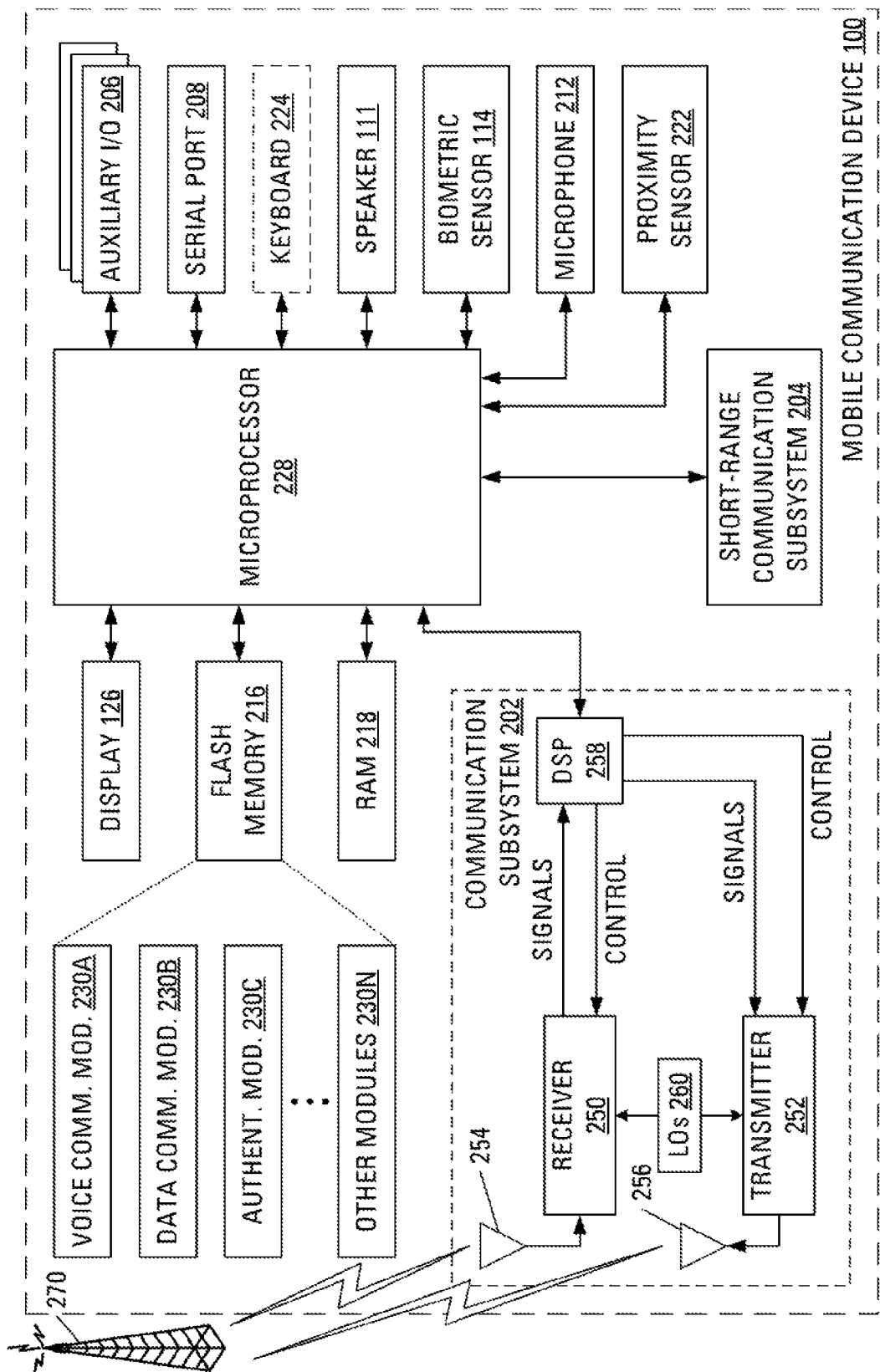
FIG. 2 illustrates an example arrangement of internal components of the mobile communication device of FIG. 1.

FIG. 2 illustrates an example arrangement of internal components of the mobile communication device 100. A processing device (a microprocessor 228) is shown schematically in FIG. 2 as coupled between the keyboard 224 and the display 126. The microprocessor 228 controls the operation of the display 126, as well as the overall operation of the mobile communication device 100, in part, responsive to actuation of the keys on the keyboard 224 by a user.

In addition to the microprocessor 228, other parts of the mobile communication device 100 are shown schematically in FIG. 2. These may include a communications subsystem 202, a short-range communications subsystem 204, the keyboard 224 and the display 126. The mobile communication device 100 may further include other input/output devices, such as a set of auxiliary I/O devices 206, a serial port 208, the speaker 111, a microphone 212, a biometric sensor (such as the multicolor fingerprint scanning interface 114 of FIG. 1) and a proximity sensor 222. The mobile communication device 100 may further include memory devices including a flash memory 216 and a Random Access Memory (RAM) 218 as well as various other device subsystems. The mobile communication device 100 may comprise a two-way, radio frequency (RF) communication device having voice and data communication capabilities. In addition, the mobile communication device 100 may have the capability to communicate with other computer systems via the Internet.

Operating system software executed by the microprocessor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the mobile communication device 100. A predetermined set of software applications that control basic device operations, such as a voice communications module 230A and a data communications module 230B, may be installed on the mobile communication device 100 during manufacture. An authentication module 230C may also be installed on the mobile communication device 100 during manufacture, to implement aspects of the present disclosure. As well, additional software modules, illustrated as an other software module 230N, which may be, for instance, a Personal Information Manager (PIM) application, may be installed during manufacture. The PIM application may be capable of organizing and managing data items, such as e-mail messages, calendar events, voice mail messages, appointments and task items. The PIM application may also be capable of sending and receiving data items via a wireless carrier network 270 represented by a radio tower. The data items managed by the PIM application may be seamlessly integrated, synchronized and updated via the wireless carrier network 270 with the device user's corresponding data items stored or associated with a host computer system.

Communication functions, including data and voice communications, are performed through the communication subsystem 202 and, possibly, through the short-range communications subsystem 204. The communication subsystem 202 includes a receiver 250, a transmitter 252 and one or more antennas, illustrated as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the mobile communication device 100 is intended to operate. For example, the communication subsystem 202 of the mobile communication device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), Long Term Evolution (LTE) etc. Other types of data and voice networks, both separate and integrated, may also be utilized with the mobile communication device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 100 may send and receive communication signals over the wireless carrier network 270. Signals received from the wireless carrier network 270 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the wireless carrier network 270 are processed (e.g., modulated and encoded) by the DSP 258 and are then provided to the transmitter 252 for digital to analog conversion, frequency up conversion, filtering, amplification and transmission to the wireless carrier network 270 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 202 and is input to the microprocessor 228. The received signal is then further processed by the microprocessor 228 for output to the display 126, or alternatively to some auxiliary I/O devices 206. A device user may also compose data items, such as e-mail messages, using the keyboard 224 and/or some other auxiliary I/O device 206, such as the navigation device 106, a touchpad, a rocker switch, a thumb-wheel, a trackball, a touchscreen, or some other type of input device. The composed data items may then be transmitted over the wireless carrier network 270 via the communication subsystem 202.

In a voice communication mode, overall operation of the device is substantially similar to the data communication mode, except that received signals are output to the speaker 111, and signals for transmission are generated by a microphone 212. Alternative voice or audio I/O subsystems, such as a voice message recording subsystem, may also be implemented on the mobile communication device 100. In addition, the display 126 may also be utilized in voice communication mode, for example, to display the identity of a calling party, the duration of a voice call, or other voice call related information.

The short-range communications subsystem 204 enables communication between the mobile communication device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

In overview, the present application describes controlling, with the microprocessor 228, a perceived color for the multicolor fingerprint scanning interface 114 to be indicative of predefined conditions.

It is proposed herein to build the multicolor fingerprint scanning interface 144 to include multiple color elements. A perceived color for the multicolor fingerprint scanning interface 144 may be controlled, by, for example, a driver, by controlling current flow in rows and columns of the color-controlled layer. By controlling the perceived color for the color elements, the microprocessor 228 may control the perceived color for the multicolor fingerprint scanning interface 114.

Figure 3:
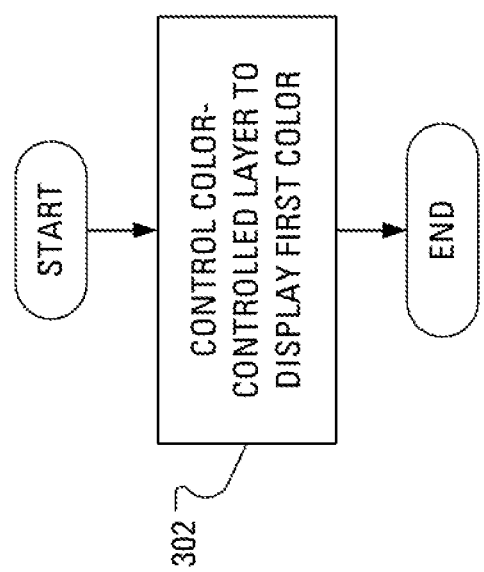
FIG. 3 illustrates example steps in a method of changing the color of the multicolor fingerprint scanning interface to a default color matching the device of FIG. 1.

As an initial, default, condition, the microprocessor 228 may control (step 302, see FIG. 3) the color-controlled layer to display a first color that approximates a color for a portion of a surface of the mobile computing device that surrounds the biometric sensor. That is, in an example wherein the housing 101 is black, the microprocessor 228 may control the color-controlled layer to display black.

The material, from which the housing 101 is manufactured (e.g., plastic, glass, carbon fiber), may have an inherent gloss or other finish recognizable to the human eye. It is recognized that when the color-controlled layer is controlled to display black, the color-controlled layer will still be discernable from the housing 101. However, it is considered that the user will have an improved impression of the mobile communication device 100, as a whole, when the color-controlled layer is controlled to match the housing 101, rather than contrast with the housing.

In practice, the microprocessor 228 may communicate with a sensor driver module (not shown). The sensor driver module may have an interrupt connected to the color-controlled layer. Upon receipt of a signal on the interrupt from the sensor driver module, a color change in the color-controlled layer may be implemented. The color change may be considered to be a global edit, with the color of the entire color-controlled layer changing in a uniform way.

The color change may also occur for a fixed period of time, after which the color may not change for a fixed period of time, or it may alternate with a subsequent color change for a fixed period of time. This will appear as the color flashing or rotating cyclically.

Figure 4:
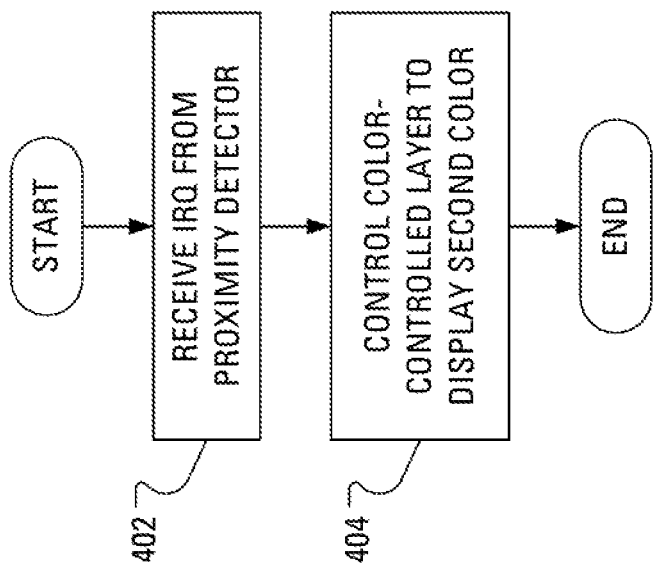
FIG. 4 illustrates example steps in a method of changing the color of the multicolor fingerprint scanning interface responsive to a user finger approaching the device of FIG. 1.

One condition under which the color of the color-controlled layer may be changed is when a user finger is approaching. FIG. 4 illustrates example steps in a method of changing the color of the color-controlled layer responsive to a user finger approaching. The approach of the user finger may be sensed by the proximity sensor 222. Responsive to sensing the approach of the user finger, the proximity sensor 222 may send an interrupt request (or IRQ) to the microprocessor 228 that temporarily stops a running program and allows a special program, an interrupt handler, to run instead.

Responsive to receiving (step 402) the IRQ from the proximity sensor 222, the microprocessor 228 may control (step 404) the color-controlled layer to display a second color. In one embodiment of the present application, rather than continuously displaying the second color, the microprocessor 228 may control the color-controlled layer to oscillate between displaying the second color and displaying the first, default, color. When the color is oscillating, each color may be displayed for a period of time having a corresponding duration.

Figure 5:
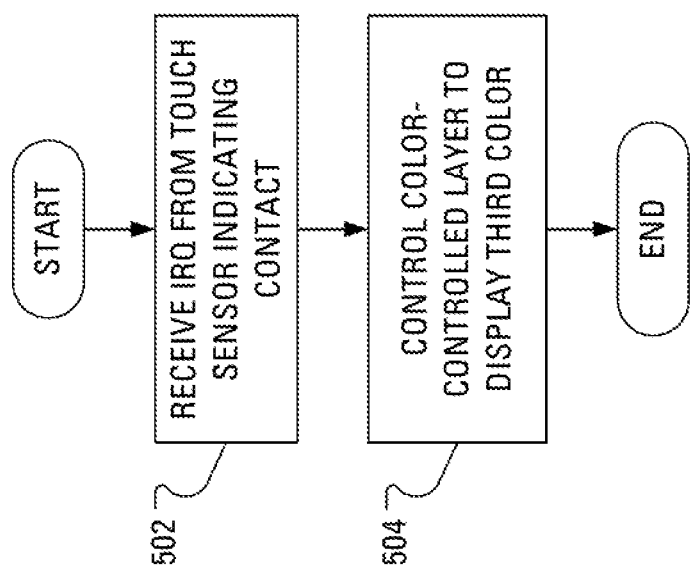
FIG. 5 illustrates example steps in a method of changing the color of the multicolor fingerprint scanning interface responsive to a user finger contacting the device of FIG. 1.

Another condition under which the color of the color-controlled layer may be changed is when a user finger comes into contact with a surface over the multicolor fingerprint scanning interface 114. To implement this optional aspect of the present application, a capacitive touch sensor (not shown) may overlay the color-controlled layer that, itself, overlays the multicolor fingerprint scanning interface 114. FIG. 5 illustrates example steps in a method of changing the color of the color-controlled layer responsive to a user finger contacting the surface over the multicolor fingerprint scanning interface 114.

The contact of the user finger may be sensed by the capacitive touch sensor. Responsive to sensing the contact of the user finger, the capacitive touch sensor may send an IRQ to the microprocessor 228. Responsive to receiving (step 502) the IRQ from the capacitive touch sensor, the microprocessor 228 may control (step 504) the color-controlled layer to display a third color.

Figure 6:
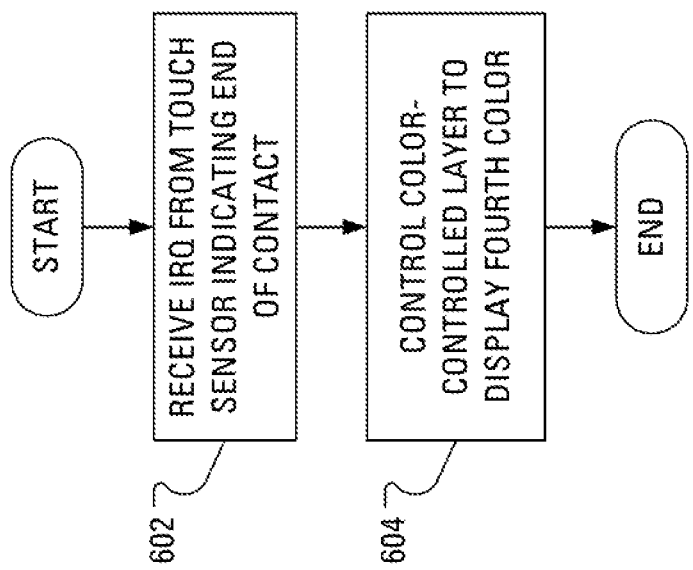
FIG. 6 illustrates example steps in a method of changing the color of the multicolor fingerprint scanning interface responsive to a user finger ending contact with the device of FIG. 1.

A further condition under which the color of the color-controlled layer may be changed is when a user finger ends contact with the surface over the multicolor fingerprint scanning interface 114. FIG. 6 illustrates example steps in a method of changing the color of the color-controlled layer responsive to a user finger ending contact with the surface over the multicolor fingerprint scanning interface 114.

The end of contact of the user finger may be sensed by the capacitive touch sensor. Responsive to sensing the end of contact of the user finger, the capacitive touch sensor may send an IRQ to the microprocessor 228. Responsive to receiving (step 602) the IRQ from the capacitive touch sensor, the microprocessor 228 may control (step 604) the color-controlled layer to display a fourth color.

Figure 7:
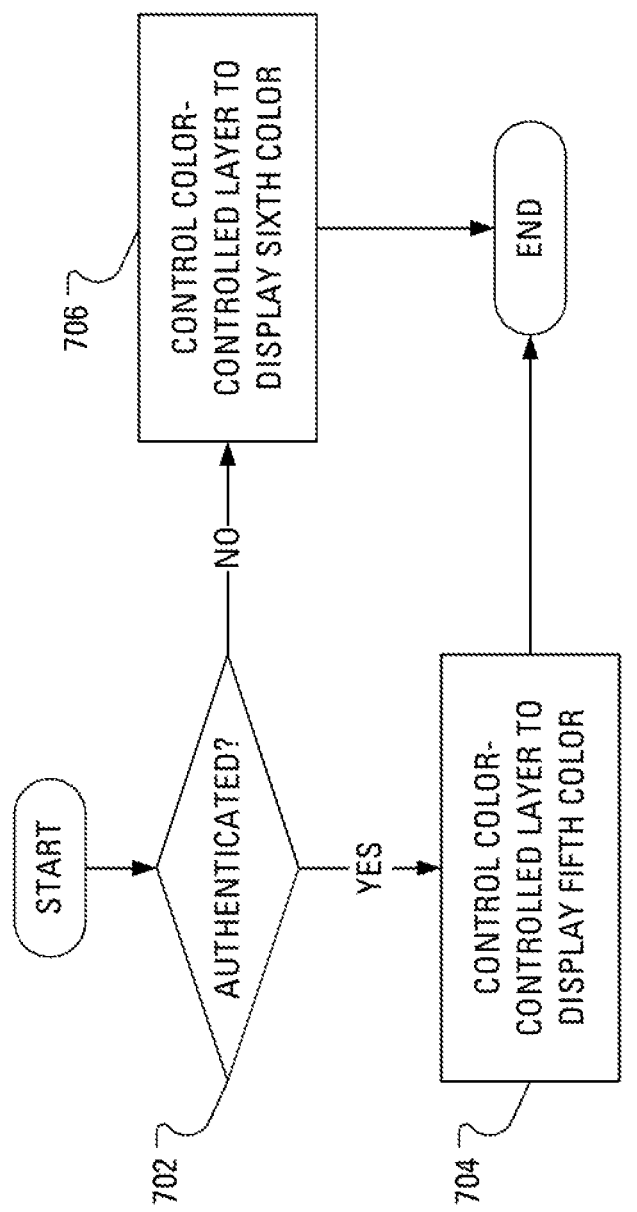
FIG. 7 illustrates example steps in a method of changing the color of the multicolor fingerprint scanning interface dependent upon success of authentication.

Still further conditions under which the color of the color-controlled layer may be changed relate to a result of an authentication of the fingerprint sensed by the multicolor fingerprint scanning interface 114. FIG. 7 illustrates example steps in a method of changing the color of the color-controlled layer dependent upon success of authentication.

Responsive to determining (step 702) that fingerprint authentication has been successful, the microprocessor 228 may control (step 704) the color-controlled layer to display a fifth color. In contrast, responsive to determining (step 702) that fingerprint authentication has been unsuccessful, the microprocessor 228 may control (step 706) the color-controlled layer to display a sixth color.

In addition to a color change upon successful authentication, an additional operation may be performed. This operation could include unlocking the device and discontinuing the current flow provided to the control-controlled layer such that no color change occurs. Additional color changes may also occur in response to specific notifications. For example, a specific color may be identified to correspond to an email notification, or a phone call, or an application update.

Thus far, it has been discussed that the color-controlled layer may be controlled to change color. The following provides an example of the manner in which the color-controlled layer may be structured so that the color-controlled layer may be so controlled.

The multicolor fingerprint scanning interface 114 may, for example, operate, at least in part, based on a thermal technique that has been known in the fingerprint capture industry for over a decade. A principle of operation of example fingerprint sensors that use the thermal technique may rely on the fact that, according to the so-called "active thermal proximity principle," the example fingerprint sensor produces regular bursts of heat when sensing a fingerprint.

Figure 8:
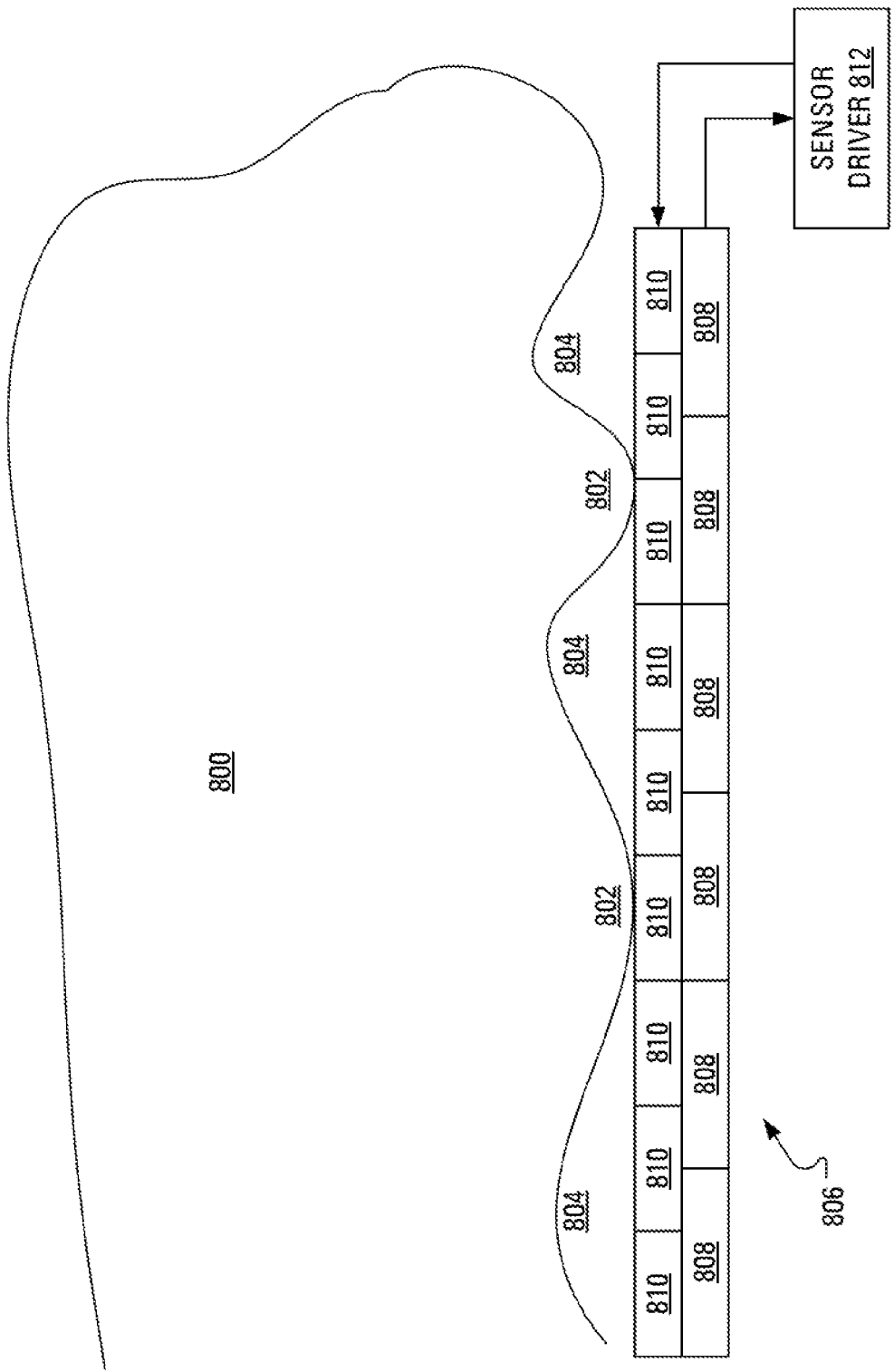
FIG. 8 illustrates, in cross-section, a finger and an example fingerprint sensor.

FIG. 8 illustrates, in cross-section, a finger 800 and an example fingerprint sensor 806. The finger 800 is known to have a fingerprint that is defined by ridges 802 and valleys 804. The example fingerprint sensor 806 includes a sensor driver 812 in communication with a layer of heating elements 810 and a layer of sensing elements 808. The layer of heating elements 810 overlays the layer of sensing elements 808.

More particularly, in the case wherein the finger 800 is in contact with the example fingerprint sensor 806, the heating elements 810 are controlled, by the sensing element, to generate heat. Where a fingerprint is in contact with the example fingerprint sensor 806, some of the heat generated by a first heating element 810 is absorbed by, or otherwise transferred to, the fingerprint ridge 802. A first sensing element 808 in close proximity to the first heating element 810 may indicate, to the sensor driver 812, a first sensed temperature. While the same fingerprint remains in contact with the fingerprint sensor, some of the heat generated by a second heating element is not absorbed, or otherwise transferred to, the fingerprint, since the second heating element is proximate to a valley 804 rather than a ridge 802. A second sensing element 808 in close proximity to the second heating element 810 may indicate, to the sensor driver 812, a second sensed temperature. On the basis of the second sensed temperature being greater than the first sensed temperature, since the second sensed temperature corresponds to a valley, the example fingerprint sensor 806 may identify a location for a ridge 802 and a valley 804. Based on additional temperatures reported by additional sensing elements 808, the example fingerprint sensor 806 may begin to determine the location of many ridges 802 and valleys 804 to generate a representation for a sensed fingerprint of the finger 800.

In overview, it is proposed herein to construct the multicolor fingerprint scanning interface 114 by including, in a layer of heating elements, thermochromic polymer elements in a manner such that there is no overlap, nor any interference, between the heating elements and the thermochromic polymer elements.

Thermochromic polymer elements are known to implement a change of color responsive to temperature change. Accordingly, through control of the temperature of the thermochromic polymer elements, the perceived color of the multicolor fingerprint scanning interface 114 may be controlled.

Figure 9:
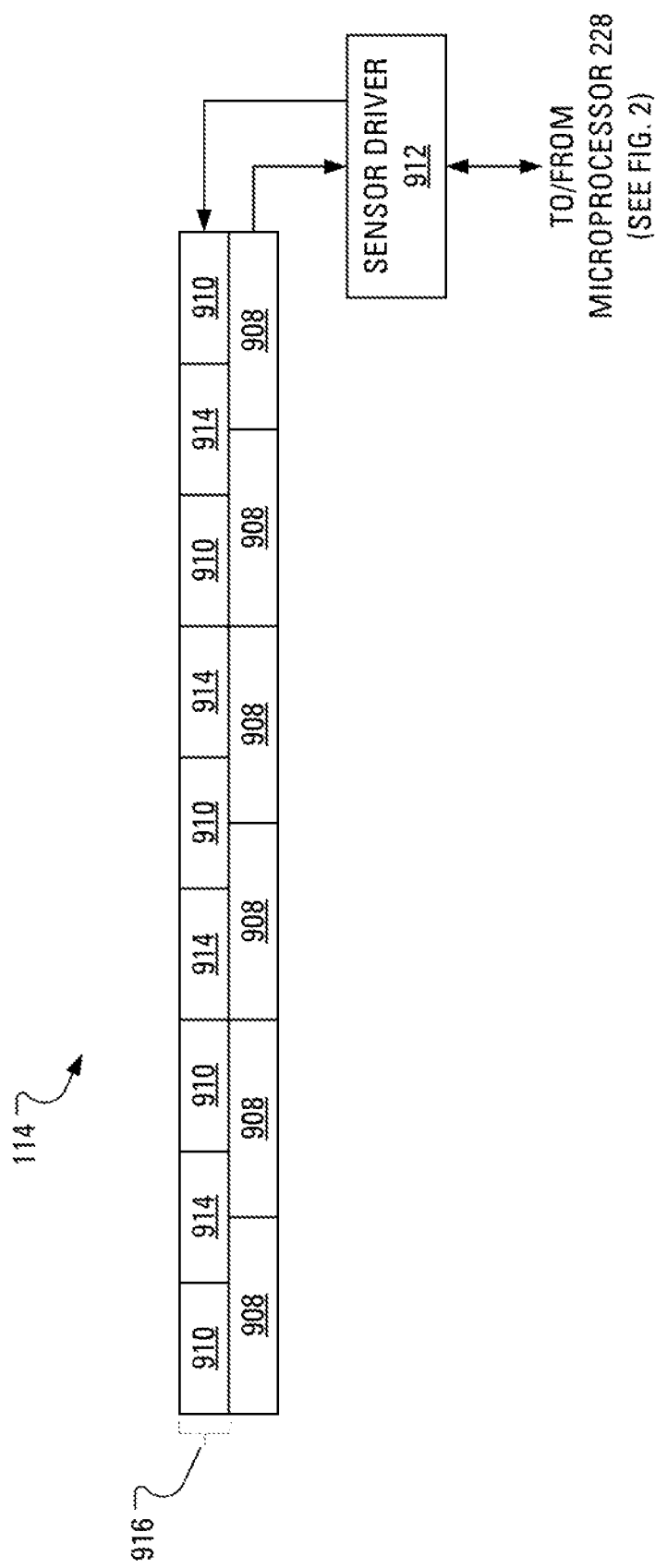
FIG. 9 illustrates, in cross-section, an example structure for the multicolor fingerprint scanning interface of FIG. 1, the example structure including a mixed-element layer.

FIG. 9 illustrates, in cross-section, an example structure for the multicolor fingerprint scanning interface 114. The multicolor fingerprint scanning interface 114 includes a sensor driver 912 in communication with a mixed-element layer 916 and a layer of sensing elements 908. The mixed-element layer 916 overlays the layer of sensing elements 908. The mixed-element layer 916 includes heating elements 910 and thermochromic polymer elements 914.

The thermochromic polymer elements 914 may be implemented as flexible, epoxy elements that are, for example, approximately 25 microns thick. The thermochromic polymer elements 914 may be formed, for example, from a Leuco Dye-Developer-Solvent.

The first tests to apply thermo-responsive dyes in thermally activated systems were described in 1992. The introduced allyl aryl ethers rearrange at 180° C. to a phenol lactone, which, in turn, undergoes intramolecular proton migration to provide a colored surface. However, nonsufficient cycle number and missing switching temperatures in a practically useful range prevented its use. Therefore, leuco dye-developer complexes became important systems to achieve thermochromic properties for different polymer materials by endowing a separate phase of the thermochromic system in a non-thermochromic polymer matrix. Binary and ternary mixtures are used to enable thermochromic switching from a colorless state into a multicolored state.

A distinguishing feature of these mixtures is a strong attractive interaction between LG and LCA, leading to the formation of a colorless congruently melting compound of the form (LG)2-LCA. In the molten state, the attractive interaction between LG and the LCA is relatively weak, and the stronger interaction is between LG and CVL, producing a colored complex of the form (LG)x-CVL (x=3-9). However, upon solidification during slow cooling, the color developer LG moves from the colored (LG)x-CVL to a colorless (LG)2-LCA complex, leading to the decolorization of the mixture. Effectively, the long chain alcohol works not only as the solvent but also as a "decolorization agent" by "disabling the color developer" through complexation.

Figure 10:
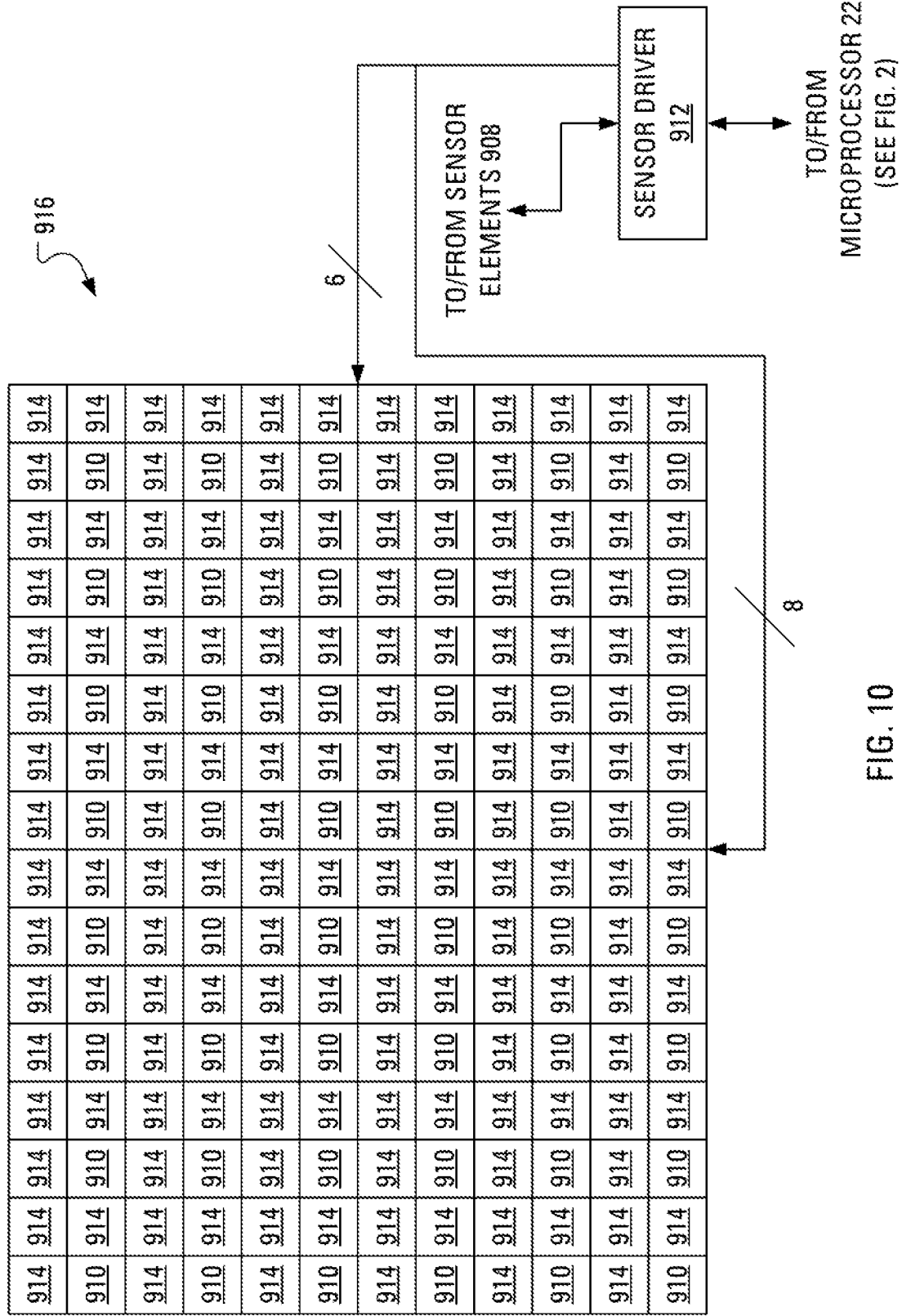
FIG. 10 illustrates, in plan view, the mixed-element layer of FIG. 9.

FIG. 10 illustrates, in plan view, the mixed-element layer 916 of FIG. 9. As illustrated in FIG. 10, the heating elements 910 are dispersed about the mixed-element layer 916 among the thermochromic polymer elements 914. In the example layout of the mixed-element layer 916 that is illustrated in FIG. 10, each of the heating elements 910 is surrounded by thermochromic polymer elements 914. As described herein above, the heating elements 910 may be controlled by the sensor driver 912.

On one hand, heating elements 910 may be controlled by the sensor driver 912 for the purposes, described hereinbefore, of obtaining a fingerprint using the sensing elements 908. On the other hand, when there is no activity in the sensing elements 908, the heating elements 910 may be controlled by the sensor driver 912 for the purposes of increasing the temperature of the thermochromic polymer elements 914 to induce a change in the polymer, thereby changing the color of the surface of the multicolor fingerprint scanning interface 114.

To comprehend the color change associated with temperature change, one may visualize a simple aquarium thermometer. A simple aquarium thermometer may cost around 11 cents to manufacture and controlling temperature range per color is accomplished using a simple polymer doping process.

Example correspondence between color and temperature is illustrated in the following table:

| Temperature (degrees Celsius) | Color |
|---|---|
| 46.75 | Green |
| 46.83 | Blue |
| 47.09 | Yellow |
| 47.24 | Grey |

Notably, a designer of the mobile communication device 100 that includes the multicolor fingerprint scanning interface 114 is encouraged to consider decoupling the heat dissipation coming from the inside of the mobile communication device 100 and generated by, e.g., a power amplifier, a battery and various integrated circuits. For example, failing to keep the temperature of the multicolor fingerprint scanning interface 114 below 46.00 degrees Celsius may cause the mixed-element layer 916 to display multiple colors simultaneously.

Although throughout the foregoing, the multicolor fingerprint sensing interface 114 has been discussed in terms of a fingerprint sensor, the person of ordinary skill in the art will understand that other biometric sensors may be adapted for a color-controlled appearance in a similar manner. Indeed, rather than a fingerprint being scanned, the biometric being scanned may be, for a mere two further examples, a palm print or an ear print.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of changing a perceptible color of a biometric sensor in a computing device, the computing device including a surface surrounding the biometric sensor, the surface having a color, the method comprising:
   controlling a current flow provided to a color-controlled layer positioned under the biometric sensor such that the perceptible color of the biometric sensor is an initial color and the initial color approximates the color of the surface.

2. The method of claim 1, further comprising:
   detecting contact with the biometric sensor; and
   responsive to the detecting, controlling the current flow provided to the color-controlled layer to thereby change the perceptible color of the biometric sensor from the initial color to a second color.

3. The method of claim 1, wherein the biometric sensor comprises one of a fingerprint sensor, an ear print sensor and a palm print sensor.

4. The method of claim 1, further comprising, responsive to sensing one of a shaking of the computing device and a gesture, controlling the current flow provided to the color-controlled layer to thereby change the perceptible color of the biometric sensor to a third color.

5. The method of claim 4, wherein the gesture comprises one of a tap, a pinch, a flick, a long press and a rotate.

6. The method of claim 1, further comprising, responsive to the detecting, controlling the current flow provided to the layer to repeat a sequence of displayed colors by cyclically:
controlling the current flow provided to the color-controlled layer to thereby change the perceptible color of the biometric sensor to the initial color for a first period of time having a first duration; and
controlling the current flow provided to the color-controlled layer to thereby change the perceptible color of the biometric sensor to the second color for a second period of time having a second duration.

7. The method of claim 1, further comprising sensing removal of a finger from contact with a surface over the fingerprint sensor.

8. The method of claim 7, further comprising, responsive to sensing removal of a finger from contact, controlling the current flow provided to the color-controlled layer to thereby change the perceptible color of the biometric sensor to a fourth color.

9. The method of claim 7, further comprising, subsequent to sensing removal of a finger from contact, determining that fingerprint authentication has been successful.

10. The method of claim 9, further comprising, responsive to determining successful authentication, controlling the current flow provided to the color-controlled layer to thereby change the perceptible color of the biometric sensor to a fifth color.

11. The method of claim 9, further comprising, responsive to determining successful authentication, performing an operation.

12. The method of claim 11, wherein the operation comprises unlocking the device.

13. The method of claim 11, wherein the operation comprises discontinuing the current flow provided to the color-controlled layer.

14. The method of claim 7, further comprising, subsequent to sensing removal of a finger from contact, determining that fingerprint authentication has been unsuccessful.

15. The method of claim 14, further comprising, responsive to determining that fingerprint authentication has been unsuccessful, controlling the color-controlled layer to thereby change the perceptible color of the biometric sensor to a sixth color.

16. A computing device comprising:
a biometric sensor;
a surface surrounding the biometric sensor, the surface having a color;
a color-controlled layer positioned under the biometric sensor;
a processor adapted to:
control a current flow provided to the color-controlled layer such that the perceptible color of the biometric sensor is an initial color and the initial color approximates the color of the surface.

17. The computing device of claim 16, wherein the processor is further adapted to:
detect contact with the biometric sensor; and
control the current flow provided to the color-controlled layer to thereby change the perceptible color of the biometric sensor from the initial color to a second color.

18. A non-transitory computer-readable medium containing computer-executable instructions that, when performed by a processor in a computing device having a biometric sensor, a surface surrounding the biometric sensor, the surface having a color, and a color-controlled layer positioned under the biometric sensor, cause the processor to:
control a current flow provided to the color-controlled layer such that the perceptible color of the biometric sensor is an initial color and the initial color approximates the color of the surface.

19. The non-transitory computer-readable medium of claim 18, wherein the instructions further cause the processor to:
detect contact with the biometric sensor; and
control the current flow provided to the color-controlled layer to thereby change the perceptible color of the biometric sensor from the initial color to a second color.

* * * * *